United States Patent

[11] 3,559,521

[72] Inventor Elisha S. Kubala
R.R. 4 Box 218, Edmond, Okla. 73034
[21] Appl. No. 800,910
[22] Filed Feb. 19, 1969
[45] Patented Feb. 2, 1971

[54] EXPANSION JOINT CUTTER
9 Claims, 5 Drawing Figs.

[52] U.S. Cl. .................................................. 83/440,
83/519, 83/581, 83/622, 83/636, 83/693, 83/917
[51] Int. Cl. ..................................................... B26d 3/14
[50] Field of Search........................................ 83/467,
468, 519, 513, 693, 917, 581, 440, 622, 636, 694

[56] References Cited
UNITED STATES PATENTS
3,240,094 3/1966 Van Endert.............. 83/694X
3,227,025 1/1966 MacMillan................. 83/917X FOREIGN PATENTS
461,561 10/1913 France......................... 83/622

Primary Examiner—James M. Meister
Attorneys—William D. Hall, Elliott I. Pollock, Fred C. Philpitt, George Vande Sande, Charles F. Steininger and Robert R. Priddy ABSTRACT: The specification discloses a cutting device for notching a three dimensional workpiece. Specifically a pair of cutting blades reciprocate at an angle to a cutting bed and a cutting anvil. The cutting blades cut against four cutting edges, with two of the four edges defined by a cutting bed and axially aligned with one another, and the other two on the anvil disposed parallel to one another and perpendicular to the first two cutting edges.

3,559,521

INVENTOR
E. S. KUBALA

BY
Robert R. Priddy
ATTORNEY

INVENTOR
E.S. KUBALA

EXPANSION JOINT CUTTER

BACKGROUND OF THE INVENTION

The present invention relates to a simple and inexpensive tool for notching a three dimensional work piece, such as an expansion joint designed to be utilized on a plaster or stucco wall. At the present time such an expansion joint with its plurality of flanges and irregular configuration, presents a work surface which may not be quickly and easily notched. It is generally necessary to notch the work piece wherever it is desired to intersect two expansion joints at right angles. These right angles are necessary to form panels or where the ceiling expansion joints come together at right angles. A similar problem presents itself in the cutting and notching of T-bars used in the installation of acoustic ceilings. The problem is generally prevalent throughout the construction industry whenever irregular and complex three-dimensional workpieces must be fitted together.

By way of illustration, it takes a workman approximately 3 minutes to cut an expansion joint with a powered band saw inasmuch as the material is of a very light gauge, and an excessive feed rate will distort the workpiece and bend it out of form. It is possible to cut the workpieces in a factory, as the expansion joints must be custom fitted by hand on the job site. It takes a workman approximately 5 minutes to cut the notches with a hand hacksaw and attempts to cut the expansion joint with tin shears have failed, as the shears will not reach certain parts of the expansion joint without distorting the metal.

In one specific installation, a contractor was presented with a situation where approximately 5,000 cuts of the expansion joint material were necessary for one construction project. Consequently, it became necessary to formulate a tool for cutting and notching expansion joint material in a quick, easy, and simple manner. It should be pointed out however, that our invention is not limited to the specific expansion joint described. Our invention also extends to any irregular three-dimensional workpiece that is difficult to shear, particularly when the workpiece is prefabricated in an irregular form.

SUMMARY OF THE INVENTION

It is an object of this invention to provide a tool which will quickly and efficiently notch an irregular three-dimensional workpiece with a minumum of effort.

It is another object of this invention to provide a portable tool that may be easily moved between construction projects to cut and notch an irregular three-dimensional workpiece.

It is another object of this invention to provide a tool that may be manufactured with a minimum number of parts, said tool being designed to notch an irregular three-dimensional workpiece.

It is still another object of this invention to provide a tool that will greatly simplify and reduce the time required to notch an irregular three-dimensional workpiece.

It is another object of this invention to simplify the fabrication and erection of complex three-dimensional workpieces in a construction project.

DETAILED DESCRIPTION OF THE PREFERRED EMBODIMENTS

Figure 1:
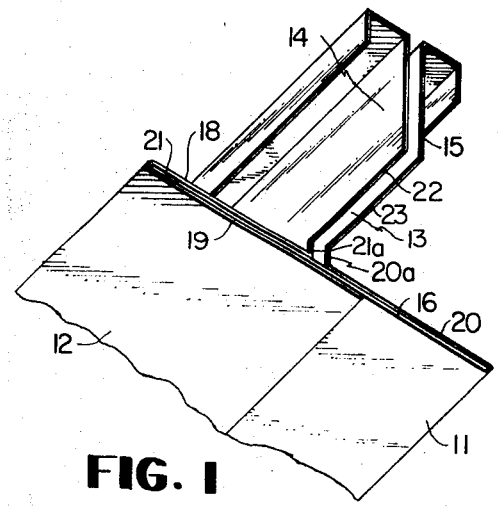
FIG. 1, is an isometric view of the irregular three-dimensional workpiece that has been notched for the fabrication of a right-angle joint.

FIG. 1 is an isometric view of an irregular three-dimensional workpiece after it has been notched for installation in a right-angle joint.

The workpiece illustrated in FIG. 1, is an expansion joint used in the construction of plaster and stucco walls, and it is necessary to notch the workpiece wherever the expansion joints must be fitted at right angles to one another. In this case, the broad flanges 11 and 12 of the first workpiece will fit in the notch, 13 cut from the upright members 14 and 15. The upright members 14 and 15 continue over the corresponding flanges 11 or 12 of another expansion joint (not shown) to fit against similar upright members (not shown) to form a right-angle joint.

As is apparent in FIG. 1, the workpiece is constructed of light gauge metal, and is formed in a bending operation so that the expansion takes place between flanges 11 and 12 as subflange 16 slides between subflanges 18 and 19.

As stated earlier, it takes a workman approximately 3 minutes to cut this notch with power band saw and 5 minutes with a hand hacksaw due to the difficulty of holding the material and the lightness of the sheet metal. It is proven impossible to cut the upright members 14 and 15 with tin shears inasmuch as the blades will not fit in the narrow space between 14 and 15. The two uprights may not be cut simultaneously with a single pair of shears as this deforms the metal and makes it unsuitable for installation.

It will be obvious from an examination of FIG. 1 that 4 cuts must be made to notch the workpiece. Two of the cuts 20 and 21 are axially aligned with one another and are in fact relatively simple cuts. These cuts continue upwardly along members 14 and 15 as illustrated at 20a and 21a to allow for the thickness of the abutting flange from another expansion joint (not shown) to which the notched workpiece will be fitted. The second two cuts 22 and 23 are parallel to each other and generally perpendicular to cuts 21 and 22 and are situated at varying elevations from 20 and 21. In actual practice cuts 22 and 23 are elevated above cuts 20 and 21 by thickness of flanges 11 and 12.

Figure 2:
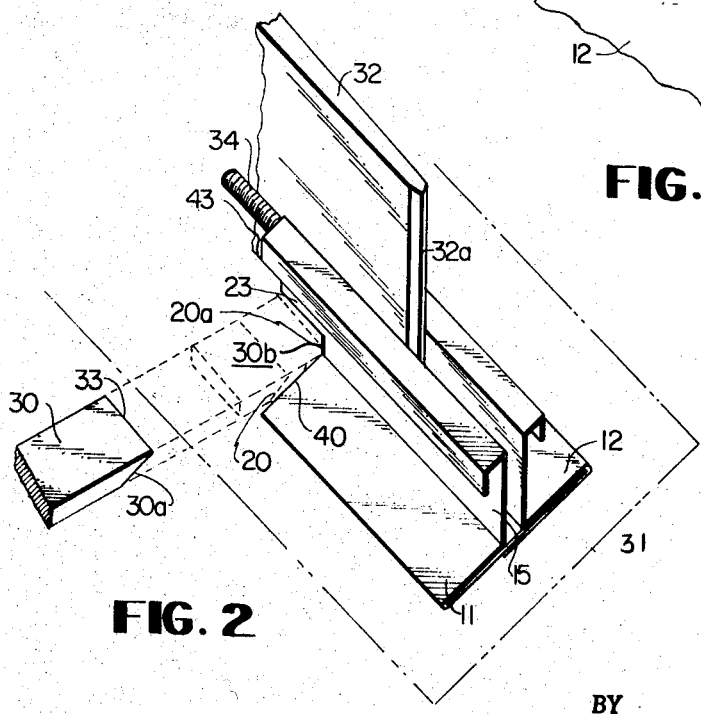
FIG. 2, is an isometric and simplified schematic of the tool workpiece, illustrating the movement of the cutting member.

FIG. 2 is an isometric diagram of the workpiece and the tool illustrating the movements of a cutting member 30. In FIG. 2 the workpiece rests upon a cutting bed 31 and is guided into proper alignment by cutting bed 31 and cutting anvil 32, cutting anvil 32 having a double-beveled edge 32a for opening workpieces 11 and 12 to the proper distance and guiding them into proper alignment. An adjustable stop 34 is provided to adjust the length of cut 23 and is readily adjustable to cut different sizes of expansion joints and thereby allow for various sized flanges.

As will be noted from FIG. 2, cutting blade 30 moves in angular relationship to cutting bed 31, and cutting edge 30a shears the workpiece 11 at cut 20 and also shears the upright member 15 at cut 20a. Cutting blade 30 is also equipped with a second cutting edge 33 which makes the cut 23 on upright member 15. The cutting edge 33 is not necessarily parallel with the alignment of workpiece 15 and anvil 32 but is generally inclined at an angle to assist in the shearing operation.

The movement of the cutting blade 30 and the angular inclination of cutting edge 30a allows for a shearing motion as it is moved in the cutting relationship with cutting bed 31.

Cut 20 is thereby accomplished between the first cutting edge 30a and the appropriate and matching cutting edge 40 defined by cutting bed 31. Cut 23 is sheared by cutting edge 33 as it moves into a shearing relation with cutting edge 43 defined by anvil 32. It should be noted that anvil 32 has an irregular notch which is defined by cutting edge 43 and cutting edge 30b.

The cut 20a is made by cutting edge 30a as it moves into a shearing relationship the cutting edge 30b of anvil 32.

Figure 4:
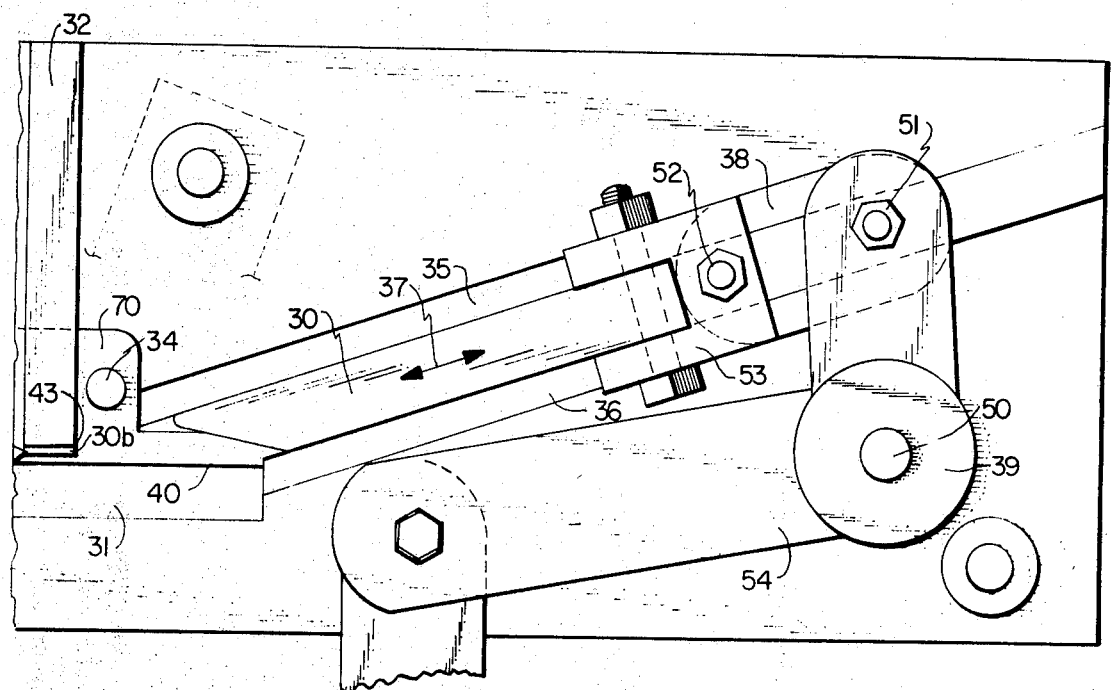

FIG. 4 is an elevation view of the guiding and cutting mechanism employed in my invention. In FIG. 4, the front plate of the tool has been removed for purposes of clarity. FIG. 4 shows the rear end of anvil 32, the cutting bed 31, and the adjustable stop 34. The workpiece is fitted in by placing the double-beveled edge 32a between upright members 14 and 15 and sliding the workpiece forward until it strikes stop 34. The flanges 11 and 12 are then resting on bed 31 with the upright members 14 and 15 located on either side of anvil 32. Cutting blade 30 is mounted in guideways 35 and 36 for reciprocal motion along the path shown by arrow 37. This reciprocal motion is imparted by crosshead 38 and bellcrank 39. Thus as bellcrank 39 rotates about pin 50, it imparts a somewhat reciprocal motion by means of crosshead 38 and pin 52. Tool holder 53 is designed so that blade 31 may be easily removed from the bifurcated portion of holder 53 when it needs sharpening or replacement.

Thus, it is apparent that bellcrank 39 and crosshead 38 translate a rotary motion about 50 into a reciprocal motion to drive cutting blade 30 along its reciprocal path within guideway 35 and 36. It also is apparent that any other form of drive means could be utilized, such as an electric, hydraulic, or pneumatic cylinder electric, drive cutting blade 30 in a reciprocal manner. Another alternate drive would be to substitute a motor gear arrangement and drive bellcrank 51 about circular axis corresponding with axis 50 and utilize bellcrank 39 and crosshead 38 to translate the rotary motion of the electric or pneumatic motor into the reciprocal motion needed for a cutting blade 30.

The present embodiment however, is illustrated to show an inexpensive and simple tool that may be manufactured at a low cost, and easily transported from job to job with a minumum amount of service requirements.

Figure 3:
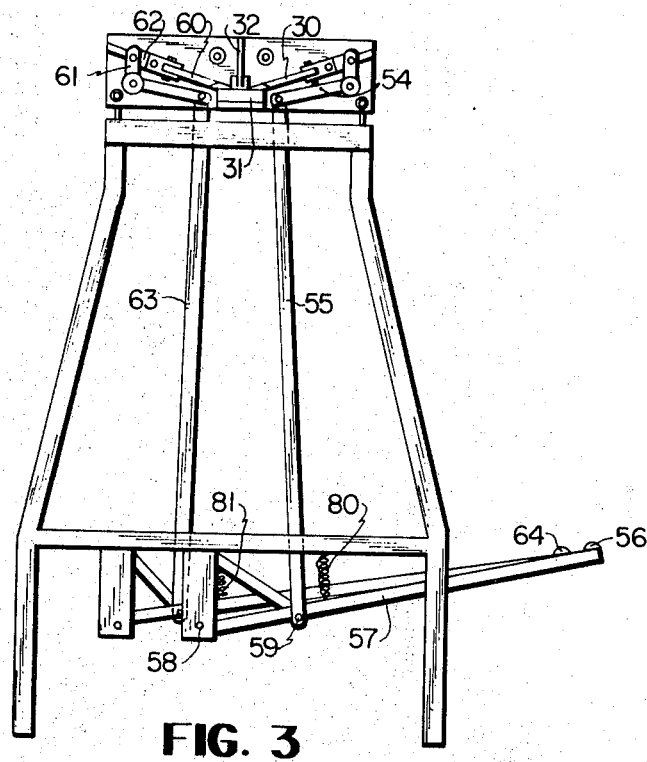
FIG. 3, is an elevation view of the tool illustrating the driving means for the cutting ways.

As illustrated in FIG. 3, the drive means also comprise a crank arm 54 and linkage rod 55 which is connected to lever 57 and pedal 56. Lever 57 is supported by and pivots around the pivot point 58 which is attached to linkage 55 at pivot point 59. Spring 80 provides a positive return for both pedal 56 and the drive mechanism in the cutting head. Thus, as spring 80 urges lever 57 upward, the force is transmitted by linkage rod 55 to the bellcrank 39 and crosshead 38 to withdraw cutting head 31 from its cutting position and hold it in the retracted position illustrated in FIG. 4.

Figure 5:
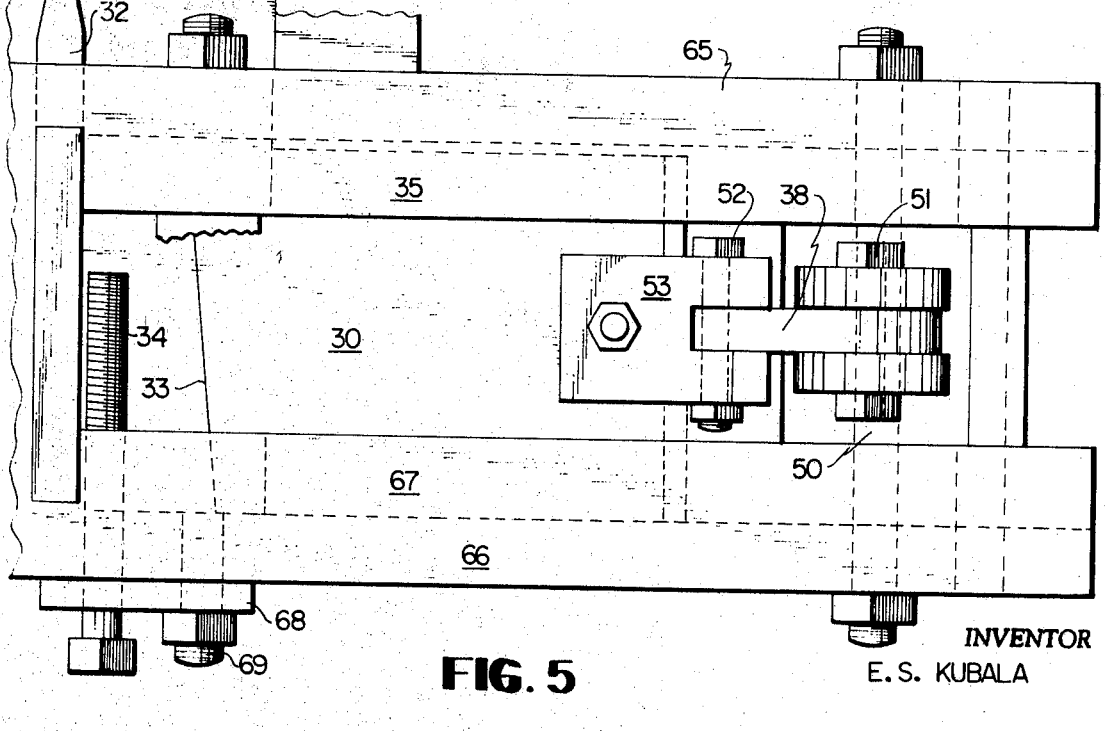

In the present embodiment, it is necessary to make 4 cuts on the expansion joint illustrated and due to the construction of the workpiece it is preferable that cuts be made from both sides of the workpiece. It is understood that an alternate form of the invention could be constructed with a single cutting element without stop 34 so that cuts may be made on one side of the workpiece in a first cutting operation, and a cut made on the other side by removing the workpiece and inserting it from the other direction. As a practical manner it has been found advantageous to provide two cutting blades to shear both sides of the workpiece without removing the workpiece from the tool. This assures that both cuts will be identical in length, and enables the operator to perform both cuts at once without removing the workpiece from the tool and turning it around. FIG. 3 illustrates the other cutting member 60, bell crank 61, crosshead 62, linkage 63, and foot pedal 64 which all cooperate in the same manner with the same result as cutting blade 30 and the associated linkages between cutting blade 30 and foot pedal 56. Similarly FIGS. 4 and 5 show only one-half of the cutting and guiding arrangement. The opposite side is for all practical purposes an exact reversal and has been eliminated for purposes of clarity.

It should be pointed out however, that the invention is not limited to a a double-cutting arrangement and it would be possible to perform the intended operation with one cutter if the guiding arrangement were modified.

FIG. 5 is a top view of the apparatus which illustrates the structural plates of frame 65 and 66 which together comprise the frame of the present invention. Guide means 35 and 67 are mounted above cutting blade 30 and guide means 36 and a corresponding guide means (not illustrated) on the other side of cutter 30 support the cutting blade during its reciprocal motion. Pin 50 extends all the way through and is anchored in plates 65 and 66.

Stops means 34 as illustrated comprises a threaded bolt 34 threaded into hangar 68 which is attached to frame member 66 by means of bolt 69. This hanger enables stop bolt 34 to extend into the hole defined by plate 66 and illustrated by the FIG. 70 in FIG. 4. The bolt is threaded for adjustment and uses a single lock nut for locking the stop in place.

It should be pointed out that only type of suitable stop means can be utilized without departing from the scope of my invention.

It should be pointed out that our invention is not limited to the expansion joints illustrated herein. It is applicable to the cutting or notching of any three dimensional irregular workpiece. Another example of such a workpiece would be the T-bar used in the installation of acoustic ceilings wherein it is necessary to form a ceiling grid with various components of the T-bar system running and meeting each other at right angles. Similarly the concepts expressed herein would be applicable to any type of complex three-dimensional workpieces that must be notched in order to fit together in their appropriate environment.

Having described not only our novel tool, but many variations by which it may be constructed we wish it to be understood that our tool is not restricted to the particular forms illustrated herein. It will be understood that many modifications and variations may be effected without departing wherein the scope of this invention, except to the extent such restrictions are clearly expressed in the following claims.

I claim:

1. A cutting device comprising:
   a. a frame;
   b. a cutting bed mounted on said frame, said cutting bed defining a pair of cutting edges;
   c. an anvil mounted adjacent to and generally perpendicular to said cutting bed and comprising a second pair of cutting edges which are disposed at an angle to said first pair of cutting edges;
   d. a first and second guideway mounted on said frame, said first guideway defining an angular path with respect to said cutting bed in a first quadrant defined by said cutting bed and said anvil, said second guideway defining an angular path with respect to said cutting bed in a second quadrant defined by said cutting bed and said anvil;
   e. a first cutting blade mounted for reciprocal movement within said guideway, said cutting blade having a first cutting edge and being positioned for cutting engagement with said cutting bed, and a second cutting edge positioned for cutting engagement with said anvil;
   f. a second cutting blade mounted for reciprocal movement with said second guideway, said second cutting blade having a third cutting edge positioned for cutting engagement with said cutting bed and a fourth cutting edge positioned for cutting engagement with said anvil;
   g. drive means for driving said first and said second cutting blades reciprocally within said first and said second guideways; and
   whereby said cutting blades will reciprocate within said guideways and traverse angular paths with respect to said cutting bed to cut a notch from a workpiece as said first cutting blade and as said second cutting blade come into cutting engagement with said cutting bed and said anvil.

2. A cutting device as claimed in claim 1 wherein said first pair of cutting edges mounted on said cutting bed and said second pair of cutting edges mounted on said anvil are mounted at varying elevations.

3. A cutting device as claimed in claim 1 wherein the two guideways are mounted at generally the same angle with respect to said cutting bed.

4. A cutting device as claimed in claim 1 wherein said first pair of cutting edges are axially aligned with one another and said second pair of cutting edges are parallel to one another and substantially perpendicular to said first pair of cutting edges.

5. A cutting device as claimed in claim 1 wherein said drive means comprise a pair of bellcranks and crossheads to translate rotary into reciprocal motion for said cutter blocks.

6. A cutting device comprising:

a. a first and second cutting bed, said second cutting bed being mounted adjacent and generally perpendicular to said first bed, said first cutting bed defining a first horizontal cutting edge, and said second cutting bed defining a second vertical and horizontal cutting edge, said second horizontal cutting edge being vertically spaced from said first horizontal cutting edge and oriented substantially 90° therefrom;

b. at least one guideway mounted between said first and second cutting beds with the guideway defining an acute angular path between said first and second beds;

c. at least one cutting member mounted for reciprocal movement within said guideway, said member having a first cutting blade edge for cutting engagement with said second horizontal cutting edge and a second cutting blade edge in cutting engagement with the first horizontal cutting member moving within said guideway with an angular motion to bear downwardly against said first horizontal cutting edge, whereby a relatively thin workpiece will be secured against said cutting bed during the cut.

7. A cutting device as claimed in claim 6 wherein said first and second cutting beds define guide means for guiding the workpiece into proper position for said cutting operation.

8. A cutting device as claimed in claim 7 wherein a drive means is employed for driving said cutting member reciprocally within said guide means.

9. A cutting device as claimed in claim 8 wherein said drive means comprise a bellcrank and crosshead for translating rotary motion to reciprocal motion for said cutting member.